US010786771B2

(12) United States Patent
Falc'hon et al.

(10) Patent No.: US 10,786,771 B2
(45) Date of Patent: Sep. 29, 2020

(54) FUEL FILTER WITH ADDITIVE RELEASE DEVICE

(71) Applicants: SOGEFI FILTRATION FRANCE, Guyancourt (FR); RHODIA OPERATIONS, Paris (FR)

(72) Inventors: Jean-Jacques Falc'hon, Velizy Villacoublay (FR); Christophe Guillon, Vire (FR); Guy Monsallier, Granville (FR); Virginie Harle, Senlis (FR); Antoine Lacarriere, Ciichy (FR)

(73) Assignees: Sogefi Filtration France, Guyancourt (FR); Rhodia Operations, Paris (FR)

( * ) Notice: Subject to any disclaimer, the term of this patent is extended or adjusted under 35 U.S.C. 154(b) by 690 days.

(21) Appl. No.: 15/102,422

(22) PCT Filed: Dec. 10, 2014

(86) PCT No.: PCT/FR2014/053260
§ 371 (c)(1),
(2) Date: Jun. 7, 2016

(87) PCT Pub. No.: WO2015/086996
PCT Pub. Date: Jun. 18, 2015

(65) Prior Publication Data
US 2016/0317959 A1    Nov. 3, 2016

(30) Foreign Application Priority Data

Dec. 12, 2013   (FR) ...................................... 13 62533

(51) Int. Cl.
*B01D 29/11*    (2006.01)
*B01D 35/00*    (2006.01)
(Continued)

(52) U.S. Cl.
CPC .......... *B01D 37/025* (2013.01); *B01D 29/114* (2013.01); *B01D 35/005* (2013.01);
(Continued)

(58) Field of Classification Search
CPC combination set(s) only.
See application file for complete search history.

(56) References Cited

U.S. PATENT DOCUMENTS 3,392,753 A    7/1968   Kleinmann
3,720,230 A    3/1973   Miller et al.
(Continued)

FOREIGN PATENT DOCUMENTS

CA    2270093      10/2000
DE    40 28 253    7/1991
(Continued)

OTHER PUBLICATIONS

English translation of Written Opinion of PCT/FR2014/053260 dated Apr. 29, 2015, pp. 1-5.
(Continued)

*Primary Examiner* — Bobby Ramdhanie
*Assistant Examiner* — Michael J An
(74) *Attorney, Agent, or Firm* — McDonnell Boehnen Hulbert & Berghoff LLP

(57) ABSTRACT

The fuel filter (1) contains a filter element (4) and an additive tank (13) in a housing (2, 3). The filter element is engaged against the removable cover (3) of the housing and has a filter medium (5) extending in an annular manner around an inner space (9). An additive release device (32) extends into this inner space (9) to distribute liquid additive from the tank (13) into a fuel circulation circuit for an internal combustion engine. The additive selectively flows into a sealed distribution channel (DC) of the device (32) depending on an open or closed configuration of an actuator component (62)
(Continued)

associated with the distribution channel. The distribution channel (DC) opens into a fuel channel (52) of the cover (3) that has a larger cross-section than the distribution channel (DC).

20 Claims, 7 Drawing Sheets

(51) Int. Cl.
    *B01D 35/153*     (2006.01)
    *B01D 37/02*     (2006.01)
    *F02M 25/00*     (2006.01)
    *F02M 37/22*     (2019.01)

(52) U.S. Cl.
    CPC .......... *B01D 35/153* (2013.01); *F02M 25/00* (2013.01); *F02M 37/22* (2013.01); *B01D 2201/208* (2013.01)

(56) References Cited

U.S. PATENT DOCUMENTS

| | | | | |
|---|---|---|---|---|
| 4,265,748 | A * | 5/1981 | Villani | B01D 27/08 210/132 |
| 4,369,113 | A * | 1/1983 | Stifelman | B01D 27/08 210/440 |
| 4,736,769 | A | 4/1988 | Belanger | |
| 4,755,289 | A * | 7/1988 | Villani | B01D 27/08 210/132 |
| 6,223,526 | B1 | 5/2001 | Wissler et al. | |
| 7,931,817 | B2 * | 4/2011 | Bilski | B01D 27/08 137/2 |
| 2001/0037971 | A1 * | 11/2001 | Bergeron | B01D 35/306 210/443 |
| 2003/0188474 | A1 | 10/2003 | Cook et al. | |
| 2005/0167351 | A1 | 8/2005 | Herman et al. | |
| 2010/0108018 | A1 | 5/2010 | Jefferies et al. | |
| 2012/0325752 | A1 * | 12/2012 | Baldwin, Jr. | B01D 35/153 210/742 |

FOREIGN PATENT DOCUMENTS

| | | | |
|---|---|---|---|
| EP | 0 671 205 | 9/1995 | |
| EP | 1 061 251 | 12/2000 | |
| EP | 1 344 813 | 9/2003 | |
| FR | 2 312 062 | 12/1976 | |
| FR | 2 668 203 | 4/1992 | |
| GB | 2 254 610 | 10/1992 | |
| IT | 2014135935 A1 * | 9/2014 | ............ B01D 37/02 |
| WO | 1997/19022 | 5/1997 | |
| WO | 2001/10545 | 2/2001 | |
| WO | 2003/053560 | 7/2003 | |
| WO | 2005014994 | 2/2005 | |
| WO | 2005/113279 | 12/2005 | |
| WO | 2008/116550 | 10/2008 | |
| WO | 2010/150040 | 12/2010 | |

OTHER PUBLICATIONS

English translation of the International Search Report of PCT/FR2014/053260 dated Apr. 29, 2015, pp. 1-2.

* cited by examiner

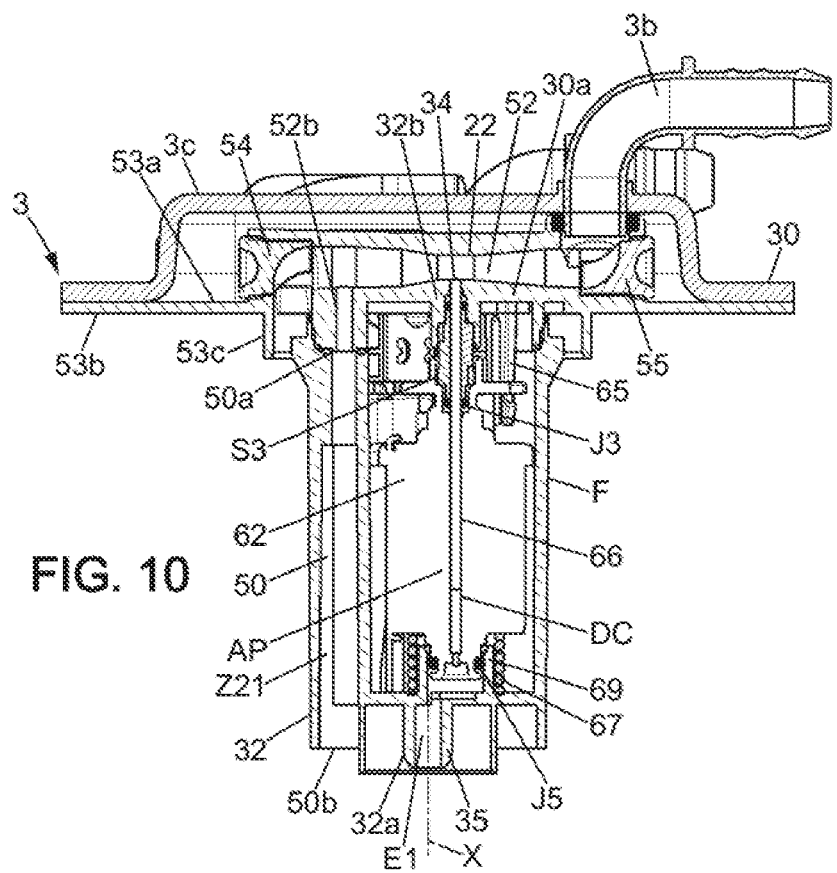
FIG. 10
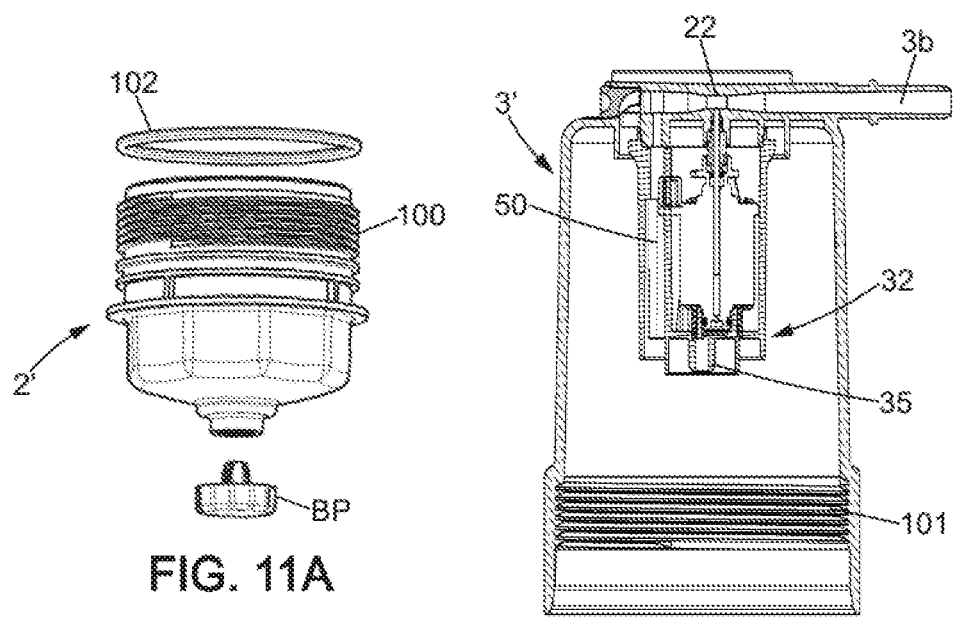
FIG. 11A
FIG. 11B

FUEL FILTER WITH ADDITIVE RELEASE DEVICE

This application is a U.S. national phase of International Application No. PCT/FR2014/053260, filed Dec. 10, 2014, which claims priority from French Patent application no. FR 1362533, filed Dec. 12, 2013, the disclosure of each of which is hereby incorporated by reference in its entirety.

TECHNICAL FIELD OF THE INVENTION

The present invention relates to fuel filters equipping the internal combustion engines of vehicles, and in particular to diesel fuel filters which allow releasing a liquid additive for fuel.

BACKGROUND OF THE INVENTION

A fuel filter of the above type typically comprises a fuel inlet and outlet, and in a fuel supply circuit for a diesel engine allows filtering the diesel fuel to remove impurities. The additive tank is housed in the filter housing and contains a liquid additive, for improving fuel quality and in particular, fuel distribution in the engine, engine performance, engine stability during operation, and/or for facilitating the regeneration of the particulate filter. This type of liquid additive is typically useful for improving engine durability. Document WO 2012/104552 describes such a filter type, and non-limiting examples of liquid additives are provided at the end of the description in that document.

It is advantageous to be able to dispense the liquid additive without requiring high-precision metering pumps or managing an associated calculator, in order to reduce the cost of the additive dispensing device.

One advantage of the dispensing mode described in document WO 2012/104552 is the ability to extend the service period of the additive tank by limiting or even stopping the supply of additive in order to prevent, under certain conditions, excessive concentration of additive in the fuel. It also optimizes the concentration of additive in the fuel in order to find a compromise between the amount that is necessary and sufficient, and an excessive concentration which can reduce the service period of the additive tank and/or have a negative impact on other vehicle elements, such as clogging the particulate filter. For this purpose, the liquid additive is released by the effect of a pressure difference, the additive being placed in an inner flexible bag or casing with a fluidtight movable wall and being at the same pressure as the fuel placed in an outer casing of the additive chamber. Typically, the pressure difference can result from positive pressure exerted by the fuel or negative pressure near a dispensing port for the additive liquid.

An assembly combining a filter element, an additive chamber, and an actuator device allowing the release of additive is relatively complex to assemble, however, especially if one wants to be able to change the filter element and/or the additive chamber and benefit from the advantages of filtration from the outside inwards (centripetal direction with a larger filter medium surface area on the upstream side). In addition, it seems difficult to achieve a compact design of the filter when wanting to prevent, in an efficient manner, the dispensing of additive (typically when the engine is shut off) and to optimize the autonomy and/or capacity of the additive tank.

GENERAL DESCRIPTION OF THE INVENTION

The present invention aims to provide a fuel filter with an additive release device that is more suitable for installation in the crowded environment of an internal combustion engine of a motor vehicle.

To this end, the invention proposes a fuel filter comprising:
- a housing extending between a first end defining a base and a second end formed by a cover, the housing delimiting an internal volume and having an inlet for unfiltered fuel and an outlet for filtered fuel;
- a filter element which is arranged in the internal volume and which has a first axial end engaged against the cover, a second axial end, and a substantially annular filter medium extending between the first axial end and the second axial end, the filter medium having an inner face defining an inner space;
- an additive tank containing a liquid additive suitable for mixing with fuel; and
- an additive release device for dispensing the liquid additive from said tank into a fuel circulation circuit for an internal combustion engine, the additive release device comprising a distribution channel and at least one actuator component adapted for selectively sealing, totally or partially, said distribution channel, wherein at least for an open position of the actuator component, the distribution channel is in fluid communication with the additive tank and opens into a fuel channel of the cover that has a larger cross-section than the distribution channel;

the additive release device extending at least partially into the inner space, the actuator component extending into this inner space, and preferably at a distance from the second end of the housing.

With these arrangements, optimal use is made of the inner space, and the additive chamber can be at least as wide as the filter element. The additive distribution channel, typically fluidtight, can traverse the actuator component in the inner space and extend along the same general direction (the lengthwise orientation of the actuator component). In addition, the connection to the additive tank may be established in an inner area of the filter element, which limits the risk of inadvertent contact by a user with the additive tank outlet.

The actuator component, typically electrically powered, can be connected to second end of the housing, advantageously in a more central position (closer to the longitudinal axis of the filter element) than the fuel inlet and outlet. The cover may include annular members for the fluidtight separation between multiple areas of circulation, for example between the central area traversed by the additive distribution channel (and where the electrical connection may be found, if there is such), an intermediate area for the passage of filtered fuel, and an off-centered area for the passage of unfiltered fuel.

According to one feature, the additive release device is secured to a housing portion selected from among the cover and the base and is fixed in translation along a longitudinal axis of the filter element relative to this housing portion. Thus, at least the filter element can be easily changed by detaching it from the housing portion that includes the additive release device.

According to one feature, the fuel port communicates with said inner space. It is thus possible to route the filtered fuel centripetally to the interior of the additive chamber. We combine the advantage of centripetal filtration that maximizes the filter medium surface area on the upstream side, with the absence of impurities in contact with the deformable wall of the additive tank (eliminating the risk of this wall becoming stiff from the accumulation of impurities). And when the additive is dispensed via the venturi effect, the pressure difference at the venturi is allowed to be constant over time (according to the flow of diesel fuel into the filter), which is not the case if the fuel inside the additive chamber is not filtered, due to the head loss at the filter element which would increase over time (as the filter element becomes loaded). It is preferred to avoid this creep and not be subject to possible fluctuations in the pressure differences between inside and outside the additive tank (pressure differences not constant relative to fuel flow).

In preferred embodiments of the invention, one or more of the following arrangements may possibly be used:

- the filter comprises a sleeve having a free end adapted for connection to the additive tank, this sleeve comprising a compartment to accommodate the actuator component, and a line separate from the compartment and extending between two axially opposite openings, one of the two opposite openings placing this line in communication with the fuel channel.
- the additive release device comprises an additive transport tube that defines a portion of the distribution channel, the transport tube being inserted into an additive passage of the actuator component, at least one annular gasket being mounted on the transport tube to create a seal between the compartment and the fuel channel.
- at least one annular gasket is mounted on the actuator component to create a seal between the compartment and the distribution channel.
- the filter element defines an upstream area in communication with the unfiltered fuel inlet, and a downstream area in communication with the filtered fuel outlet;
- the downstream area comprises, in the inner space, a first sub-area internal to the sleeve which is defined by said line and a second sub-area external to the sleeve which extends annularly between the inner face of the filter medium and an outer face of the sleeve.
- the unfiltered fuel inlet and the filtered fuel outlet are arranged at a distance from the base, the distribution channel defining a liquid additive dispensing port which opens into the fuel channel, the additive dispensing port being separate from the fuel inlet and outlet ports.
- the fuel channel of the cover comprises a venturi to generate a pressure difference between the fuel inlet or outlet port and the additive dispensing port.
- the fuel channel is in communication with the inner space via at least one line traversing the first axial end of the filter element, the fuel channel being delimited by a molded plastic part which comprises:
  - an upper face, optionally covered by an outer wall of the cover which provides at least one among the inlet port and outlet port; and
  - a lower face from which a tube protrudes in a direction parallel to a longitudinal axis of the filter element, the tube defining with the second axial end of the filter element an annular cover/filter element sealing area.
- the fuel channel is in communication with the filtered fuel outlet and comprises:
  - an inlet passage which is in communication with the inner space and opens near the first axial end of the filter element; and
  - a lateral passage, positioned between the inlet passage and the filtered fuel outlet.
- the additive tank is part of an additive chamber and defines, with an outer casing of this chamber, a peripheral volume which is in fluidtight communication with the lateral passage.
- the liquid additive tank has at least one movable and fluidtight wall between an internal volume of the additive tank and the peripheral volume defined by the outer casing, the movable wall providing a sealed separation and contributing to maintaining an identical pressure between the additive in the additive tank and the fuel in the peripheral volume.
- the communication line is in communication with the fuel channel of the cover and extends into the inner space, parallel with the distribution channel, so that it extends to the vicinity of the second axial end of the filter element so as to be in communication with the peripheral volume (a pressure-balancing line is thereby achieved without increasing the external dimensions of the filter).
- the venturi allows generating a pressure difference between the line of the first sub-area and the dispensing port, in other words between the pressure of the peripheral volume and that of the internal volume of the additive tank.
- the pressure-balancing line opens into the fuel channel via the lateral passage and is sealingly separated from the second sub-area by a fluidtight annular contact between the sleeve and a sealing surface (preferably an annular lip) formed on the outer casing, whereby the pressure in the peripheral volume corresponds to the pressure in the lateral passage.
- the housing comprises the cover and a bowl (comprising the base) for accommodating the additive tank, the cover comprising a sealing portion covering the bowl and an insertion portion extending into the inner space, the sealing portion including the inlet port and the outlet port.
- the insertion portion comprises the distribution channel, the actuator component, and a connecting endpiece (formed opposite to the sealing portion) for connection to the additive rank in a fluidtight seal.
- the additive release device is intended to be mounted with the cover, for example permanently, on the fuel circulation circuit.
- the insertion portion has a generally tubular shape, for example defined by the sleeve, the filter element being removably mounted around the insertion portion.
- the filter element comprises a flange at each of the first and second axial ends.
- a reinforcing member, preferably tubular, is provided to protect the inner face of the filter medium.
- the actuator component comprises a sealing member which is moved according to an electrical command received by the additive release device.
- a heating device heats the additive upstream of the dispensing port, preferably between the connecting endpiece and an inlet of the distribution channel.

BRIEF DESCRIPTION OF DRAWINGS

Other features and advantages of the invention will be apparent from the following description of several embodiments given as non-limiting examples, with reference to the accompanying drawings in which:

FIG. 3 shows a schematic cross-sectional view of the filter cartridge, at the interface between the attachment end and the proximal flange;

FIG. 10 is a longitudinal sectional view of the additive release device of FIG. 9;

FIGS. 11A and 11B show housing portions usable in an embodiment of the invention.

DESCRIPTION OF PREFERRED EMBODIMENTS OF THE INVENTION

In the various figures, identical references indicate identical or similar elements.

Figure 1:
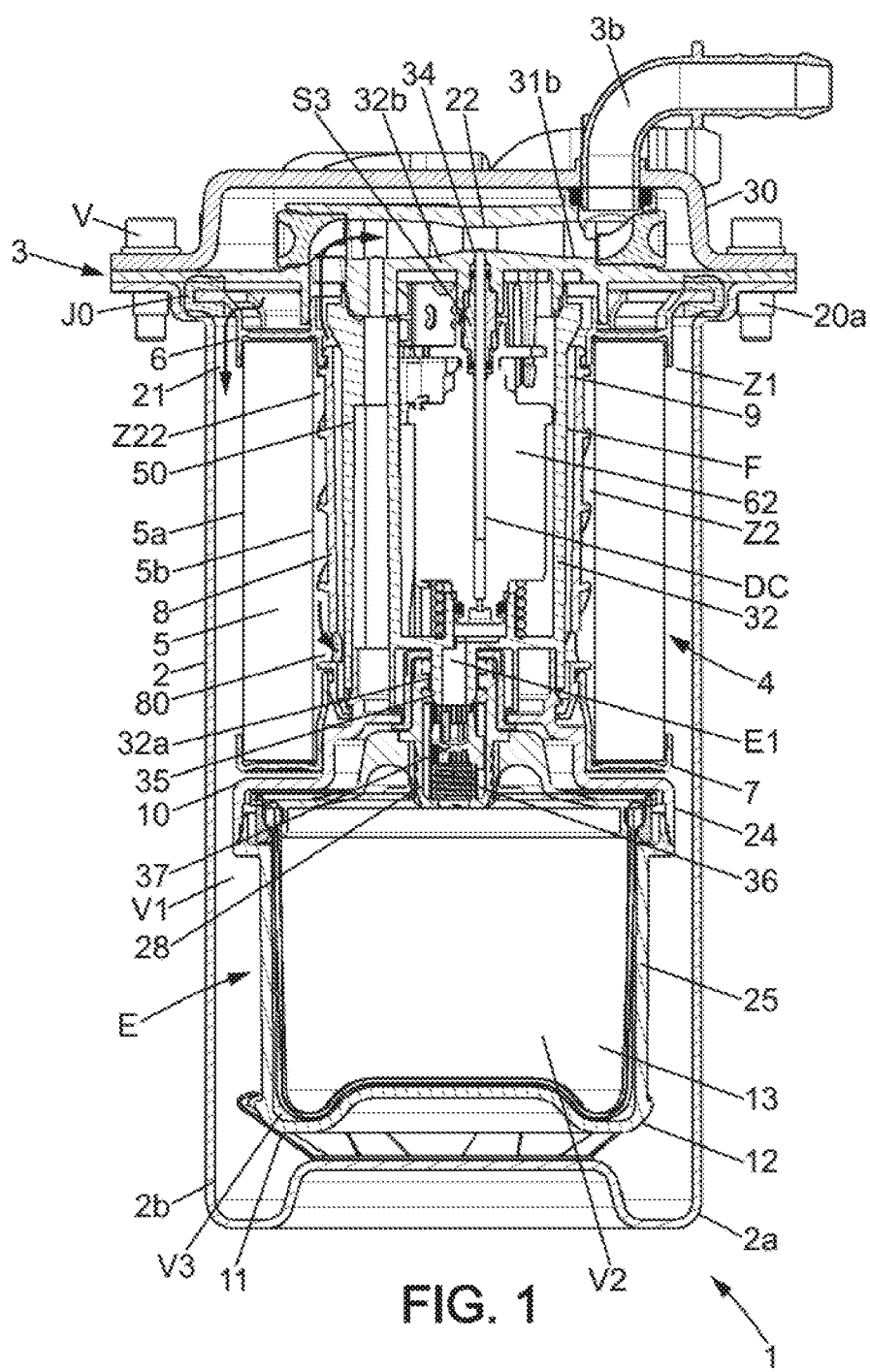
FIG. 1 is a sectional view of a fuel filter with a filter cartridge according to the invention.
Figure 2:
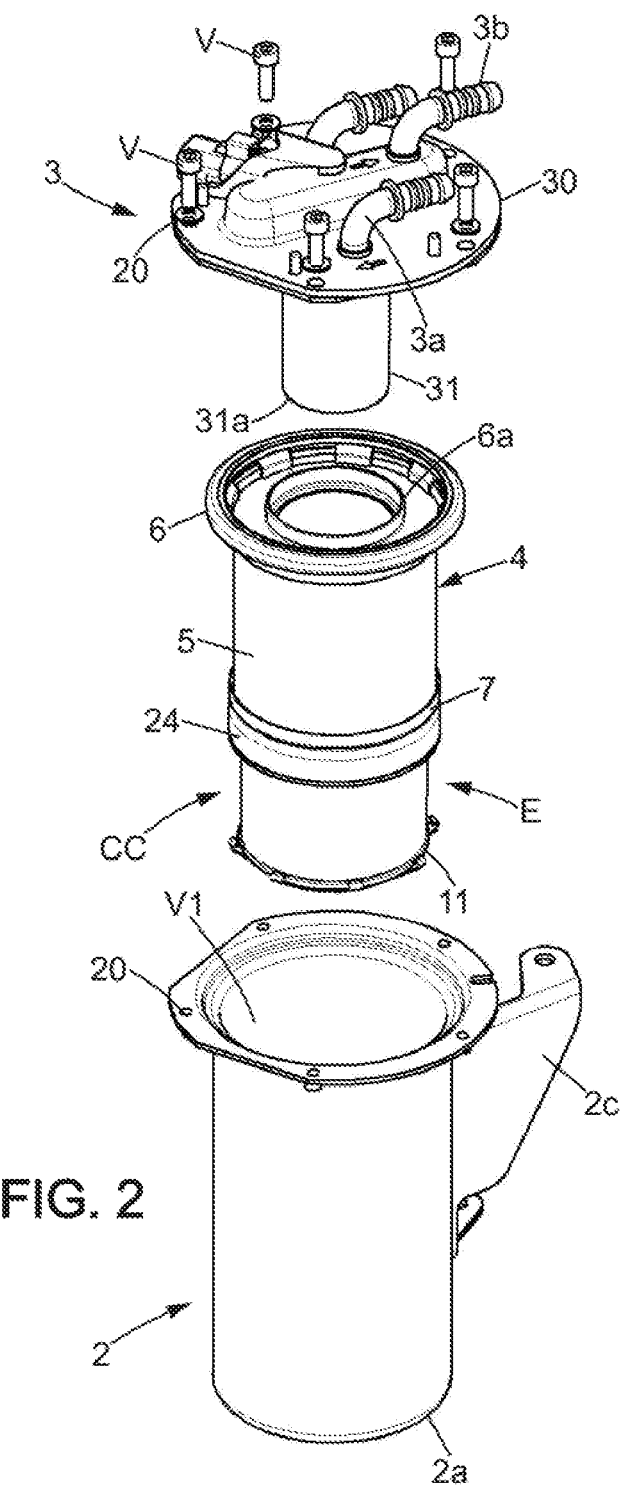
FIG. 2 is an exploded perspective view of the filter of FIG. 1.

FIGS. 1 and 2 show an embodiment of the fuel filter (for diesel or similar fuel) supporting an additive chamber E. This filter 1 comprises a housing 3) having an upper wall and a lower wall. In the non limiting example of the figures, the lower wall of the housing (2, 3) is formed by a bowl 2 of metal or plastic. The bowl 2 has a base 2a from which a side wall 2b extends upward, said side wall here being substantially cylindrical and having an upper rim directly secured to a cover 3 forming the upper wall of the housing (2, 3). This cover 3 has an edge that is attached directly to the annular edge (here circular) of the bowl 2. More generally, it is understood that the cover 3 is connected to the bowl 2 in a fluidtight manner. In the specific and non-limiting configuration of FIG. 1, there is no direct seal between the bowl 2 and the cover 3 but a seal is still provided by the gasket J0 which is on the flange 6. It is thus ensured that the gasket J0 will be changed during replacement because here it is connected to the filter element 4. In other configurations, a gasket may be mounted directly between the bowl 2 and the cover 3 without involving a third part.

The edge of the cover 3 may be, for example, screwed to the edge of the bowl 2 by means of multiple screws V passing through holes 20 and engaging with nuts 20a, or by means of a peripheral thread, in a known manner.

As illustrated in FIG. 2, this cover 3 has an inlet port 3a for fuel to be filtered and an outlet port 3b for filtered fuel, to allow the circulation and filtration of fuel inside the filter 1. The housing (2, 3) is interchangeably connectable to lines of a fuel supply system of a vehicle with combustion engine. In this example, the cover 3 forms a filter head having a "T" cross-section and comprises:

a sealing portion 30 which extends transversely above the bowl 2 and which may incorporate the inlet port 3a for unfiltered fuel and the outlet port 3b for filtered fuel; and an insertion portion 31 which extends longitudinally between a lower end 31a and an upper end 31b where it connects to the sealing portion 30.

The housing formed by the bowl 2 and the cover 3 defines an internal volume V1 in which is arranged an additive module, here in the form of an additive chamber E, and a filter element 4 of annular shape which extends along a longitudinal axis A. The longitudinal axis A is preferably a central axis of symmetry of the filter element 4 and possibly also corresponds to a central axis of the additive chamber E. Here the filter element 4 comprises a filter medium 5, a first flange at a distance from the additive chamber E and referred to in the following as the distal flange 6, and a second flange near the additive chamber E and referred to in the following as the proximal flange 7. The filter medium 5 preferably extends around the longitudinal axis A which may possibly be coincident with the axis of symmetry of the bowl 2 when the wall 2b is cylindrical for example. The filter element 4 may optionally comprise a reinforcing member 8 or an internal connecting structure between the two flanges 6, 7. The reinforcing member 8 here has a substantially tubular shape which stiffens the filter element 4 and which can channel the fuel. The reinforcing member 8 extends here between the distal flange 6 (the upper flange in FIG. 1) and the proximal flange 7 (the lower flange in FIG. 1).

Of course, other embodiments of the filter element 4 may be used, for example with only the proximal flange 7 or without any axial flange, the reinforcing member 8 in this case possibly being held in position by contact with the inner face 5b of the filter medium 5. It is also possible to have a configuration without a reinforcing member 8.

Figure 3:
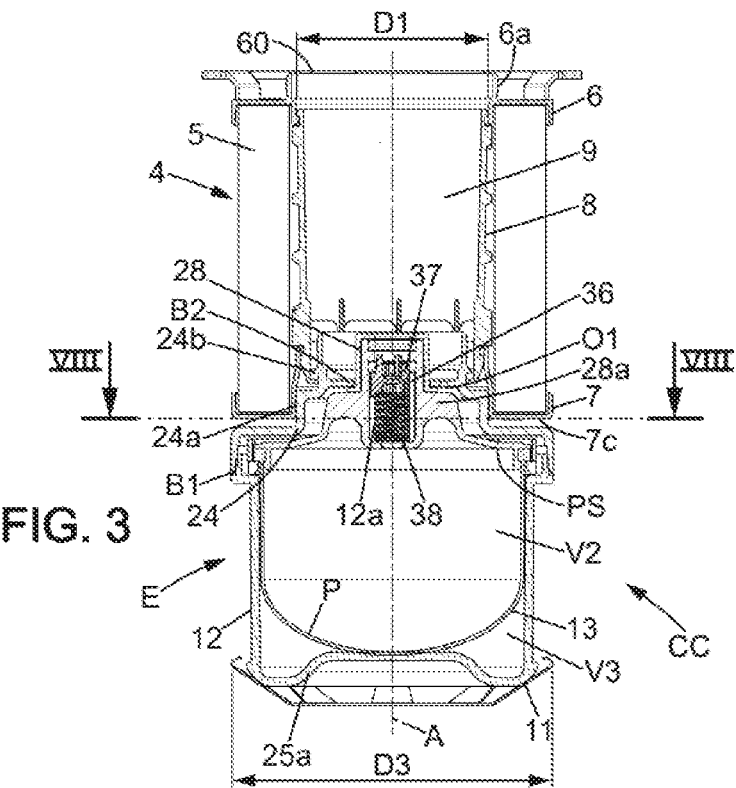
FIG. 3 is a longitudinal sectional view of a filter cartridge with additive chamber, usable in the filter of FIG. 1.

In the non-limiting example shown, the filter element 4 and the additive chamber E or analogous additive module are stacked and are secured to one another to define a combined filter cartridge CC which is clearly visible in FIGS. 2 and 3. This cartridge CC extends for example longitudinally from the base of the additive chamber E, possibly provided with a spring 11, to the distal flange 6, possibly provided with a gasket (forming the seal between the cover 3 and the bowl 2) which forms a cartridge end, as shown in FIG. 2. In the combined filter cartridge CC, an inner space 9 is defined by the inner face 5b of the filter medium 5. The additive chamber E has an attachment end 10 which can be partially inserted into the inner space 9 and enables attaching the additive chamber E on the proximal flange 7 and/or on the reinforcing member 8 of the filter element 4. The attachment end 10 may additionally be in sealing contact, for example a radial annular contact, against a tubular portion of the proximal flange 7. In an option which renders the additive module inseparable from the filter element 4, the proximal flange 7 is secured to or is incorporated into the attachment end 10.

Alternatively, the attachment end 10 may extend below the inner space 9 and connect in a fluidtight manner to the radial portion. 7c (covering the lower axial end 5c of the filter medium 5) of the proximal flange 7.

Although the following description refers to an additive tank 13 that forms part of an additive chamber 1E of the type comprising an outer casing 12 closed on the side opposite the attachment end 10, it is understood that other configurations of the tank 13 can be used in an additive module. For example, a wall P of the tank 13 may be in direct contact with fuel located near the base 2a of the housing (2, 3), and the outer casing 12 may be replaced by a rigid structure provided with openwork or through-holes to bring the tank 13 to fuel pressure.

The combined filter cartridge CC corresponds to a unit which can be integrally inserted into the housing (2, 3). The cartridge CC comprises an end adapted to abut against the base 2a of the bowl 2 and optionally having a spring 11 connected to the outer casing 12 of the additive chamber 1E, or integral with the base 2a. The cartridge CC is detachably mounted on the cover 3. A sealed connection may be provided between a projecting portion of the distal flange 6, or an associated gasket, and an annular sealing surface formed on the inner surface side of the sealing portion 30.

Alternatively, the sealed connection can be achieved by contact of a sealing lip of the filter element 4 against a peripheral annular surface of the insertion portion 31. More generally, an annular sealing contact is obtained so that the cover 3 and the filter element 4 define (in the assembled configuration of the cartridge CC) an area Z1 upstream of the filtration, that is in communication with the inlet, port 3a, and an area Z2 downstream of the filtration, that is in communication with the outlet port 3b.

Due to the detachable nature of the cartridge CC, the bowl 2 and the cover 3 are reusable parts. One or the other of these parts can be connected to the vehicle by an attachment interface. In the non-limiting example of FIG. 2, one can see that the bowl 2 comprises at least one lateral extension 2C which enables such attachment. For ergonomic reasons, the sealing portion 30 of the cover 3 may be relatively flat and devoid of any actuator member for controlling the dispensing of additive. In addition, at least a portion of the additive tank 13 may be housed in the inner space 9.

As illustrated in FIG. 1, the cover 3 integrates an additive release device 32. This liquid additive release device 32 is part of the insertion portion 31 and extends parallel to the longitudinal axis A between:
- a first axial end 32a including an additive inlet E1 in communication with the interior of the additive tank 13 of the additive chamber F; and
- a second axial end 32b provided with a dispensing port for the liquid additive which opens into the fuel outlet 3b.

Figure 5:
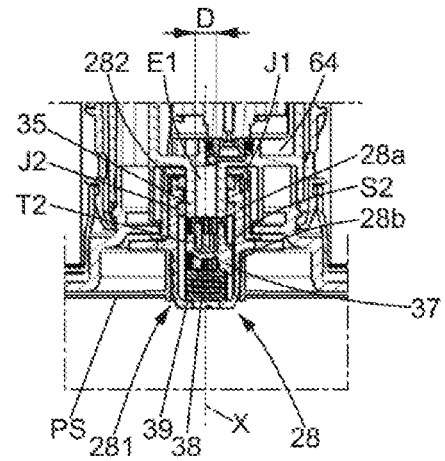
FIG. 5 shows a detail view of a variant filter cartridge usable in the filter of FIG. 1.

It is understood that the additive release device 32, which comprises the dispensing port 34 for releasing additive into a fuel circulation circuit C1, includes a distribution channel DC for circulating the liquid additive from the additive inlet E1 to the dispensing port 34. The additive inlet E1 may be defined by a connecting endpiece 35 which forms a portion of the first axial end 32a. The connecting endpiece 35 is, for example, a male connection and has a tubular shape as shown in FIG. 5.

In the embodiment of FIGS. 11A and 11B, the cartridge CC can be disassembled from the bottom, the additive release device 32 remaining fixed relative to the motor vehicle during replacement. In this example, the bowl 2 is replaced by a removable member 2' which may have a drain plug BP. The thread 100 of the removable member 2' engages with the thread 101 of the casing member 3', and an annular gasket 102 ensures a fluidtight attachment of the filter housing. It is understood that in this type of filter housing, the cartridge CC shown in FIGS. 3-4 or the one shown in FIG. 6 can be mounted in an identical manner and can function the same as with the housing shown in FIGS. 1-2.

Figure 7:
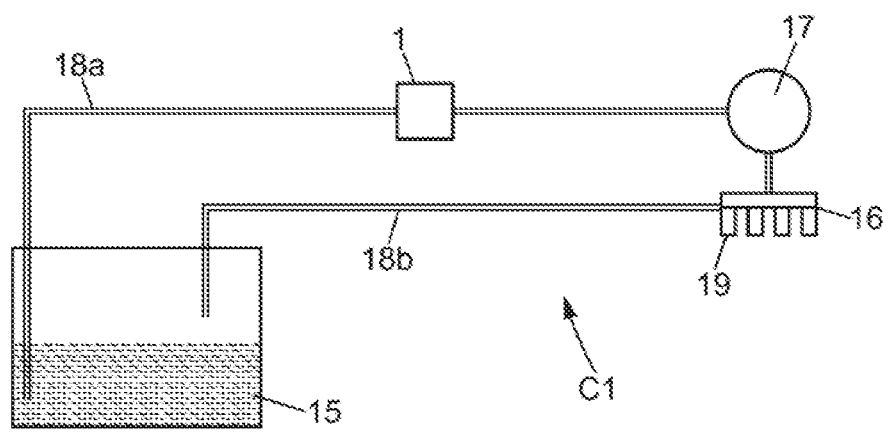
FIG. 7 schematically represents one possible arrangement of a filter having an additive dispensing function according to the invention, in a fuel circulation circuit for an internal combustion engine.

Referring to FIG. 7, an exemplary integration of the filter 1 will now be briefly described.

FIG. 7 schematically represents a fuel circulation circuit C1 for an internal combustion engine with a fuel filter 1. Conventionally, the fuel circulation circuit C1 is located between a fuel tank 15 and the common rail 16, and ensures the flow of fuel between the tank 15 and the common rail 16. The circulation circuit here comprises the filter 1 which is intended to filter the fuel, and a high-pressure pump 17. The high-pressure pump 17 and the common rail 16 constitute the fuel injection system. A first line 18a, called the "supply line", ensures the flow of fuel from the tank 15 to the common rail 16, and a second line 18b, called the "return line", ensures the flow of fuel from the injection system into the tank 15. The fuel is therefore pumped into the tank 15, then filtered in the filter 1 and supplied under pressure, via the pump 17, to the common rail 16; then a portion is directed to the injectors 19 of the engine and another portion is returned to the tank 15 via the return line 18b. Part of the fuel may also be sent from the high-pressure pump 17 to the return line 18b.

Due to the configuration of the cartridge CC in the filter 1 with additive chamber E connected to additive release device 32, the fuel circulation circuit Cl also causes liquid additive to flow to the common rail 16. In a preferred embodiment, the filter 1 has a dispensing port 34 leading to the supply line 18a, as shown in FIG. 7. However, it is also possible for the dispensing port 34 to open into a different line, for example to dispense liquid additive into the return line 18b.

An example flow of fuel in the filter 1 will now be described with reference to FIGS. 1 and 2.

Unfiltered fuel, which typically comes from the fuel tank 15, is introduced into the housing (2, 3) by the inlet port 3a and is routed into the internal volume V1 within an annular space 21 of the upstream area Z1 formed around the cartridge CC and which is delimited in particular by the outer face 5a of the filter medium 5. The fuel to be filtered, for example diesel fuel, can pass through the filter medium 5, which retains impurities including solids and possibly water (for example if a hydrophobic fabric is added or if the reinforcing member 8 includes a water separator tube with overmolded hydrophobic fabric). The filter medium 5 can be of a type known per se and will not be further described here.

After passing through the filter medium 5, the filtered fuel can flow along the inner face 5a within the inner space 9, for example downwards while being channeled by spiral reliefs of the reinforcing member 8. After passing through the reinforcing member 8 via openings (here bottom openings 80), the filtered fuel can flow (here upward) around and along the insertion portion 31 to reach the outlet port 3b. In the embodiment of FIG. 1, one can sec a venturi 22 located between the fuel inlet and outlet ports 3a-3b, creating a localized negative pressure upstream of the outlet port 3b. The filtered fuel can pass through the venturi 22 which is designed to lie in a transverse direction which is preferably perpendicular to the longitudinal axis A. When the filtered fuel reaches the outlet 3b, it may advantageously contain the additive dispensed at the venturi 22.

The venturi 22 is arranged in the sealing portion 30 of the cover, here in a fuel channel 52 adjacent to the flange 6 in the assembled state of the filter element 4, and the dispensing port 34 opens into the narrowed area of the venturi 22. The venturi thus forms a means of generating a pressure difference between one among the fuel inlet 3a and outlet 3b ports and the dispensing port 34. In the example shown, the dispensing port 34 is near the outlet port 3b, so that the liquid additive is mixed into the filtered fuel and in a portion of the downstream area Z2 located entirely outside the bowl 2.

Referring to FIGS. 1 and 10, for the downstream area Z2 one can distinguish in the inner space 9: a first sub-area Z21 internal to the sleeve F which is defined by the communication line 50, and a second sub-area Z22 external to the sleeve F which extends annularly between the inner face 5b of the filter medium 5 and an outer face of the sleeve F. In practice, the flow of filtered fuel occurs essentially in the second sub-area Z22 (when the first sub-area Z21 is already filled with fuel).

Example configurations of the additive chamber E with connection to the filter element 4 and to the insertion portion 31 of the cover 3 will now be described with reference to FIGS. 1 to 6.

The additive chamber E here has an outer casing 12 which can be obtained by a fluidtight connection of an annular part 24 to a vessel 25 that is distinct from the bowl 2. The vessel 25 and the annular part 24 may be rigid. This configuration with an outer casing 12 makes it possible to protect the integrity and fluidtightness of the at least partly flexible tank 13, and to facilitate connection and assembly with the filter element 4, for example by the use of guiding and/or attachment surfaces 24a formed on the annular part 24. This also ensures that the fuel around the additive tank 13 is clean.

This outer casing 12 has a liquid additive outlet pipe 12a, preferably only one, which is defined by an external connection 28. The outer casing also includes at least one fuel port O1 to allow fuel to enter the additive chamber E, around the tank 13. As shown in FIGS. 1 and 3, the tank 13 may be composed of a flexible fluidtight wall P, here forming a bowl, and an upper wall PS, preferably rigid in its central portion. The tank 13 extends inside the outer casing 12 and the wall P is movable and fluidtight between the internal volume V2 of the tank 13 and a peripheral volume V3 defined by the outer casing 12. It is understood that this wall P provides a fluidtight separation and also maintains equal pressure between the additive in the tank 13 and the fuel in the additive chamber E.

Figure 6:
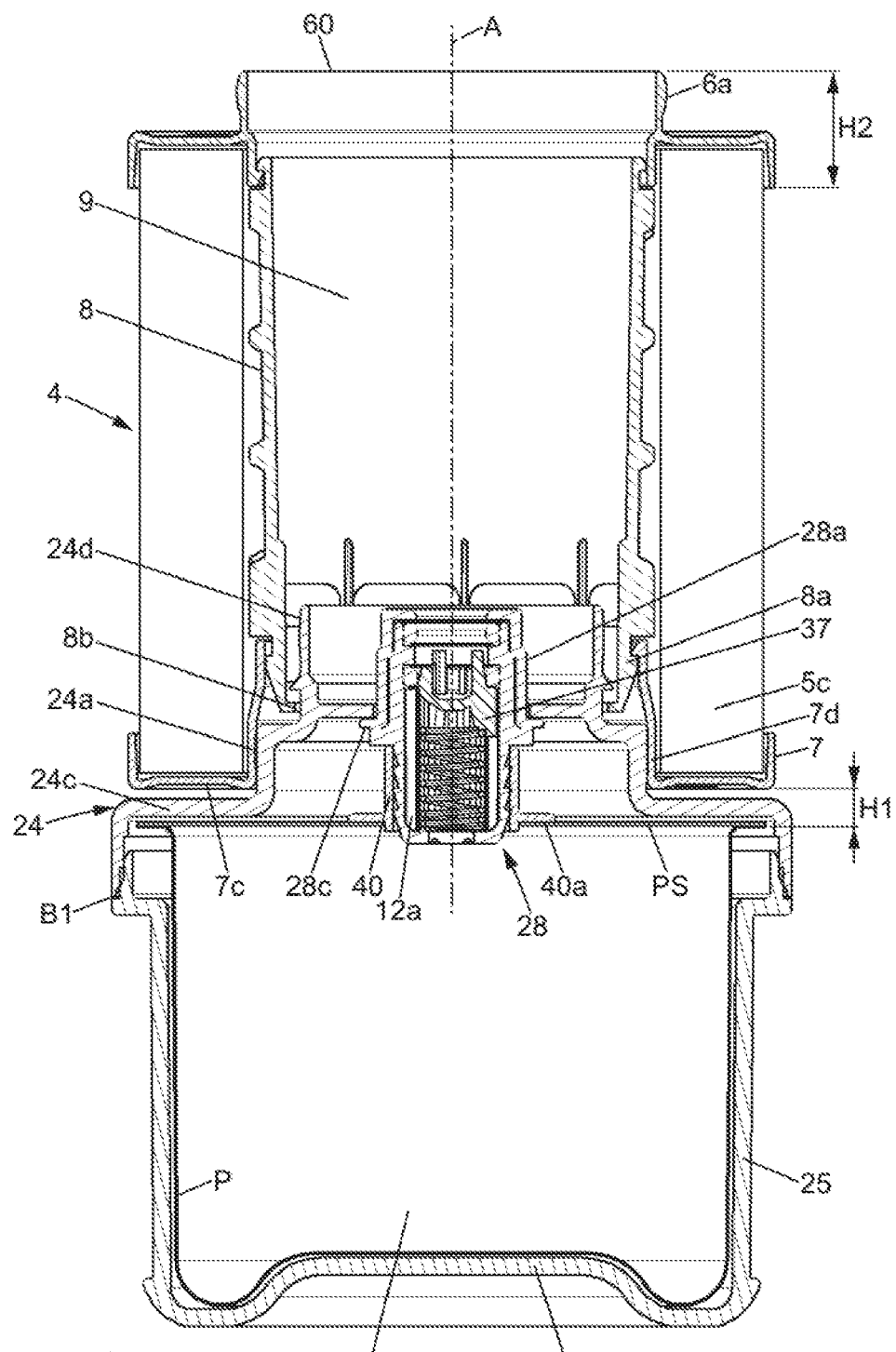
FIG. 6 shows a detail view of the attachment of the additive chamber, and also a cartridge variant.

In the example of FIG. 3, the upper wall PS comprises the external connection 28 and extends transversely to the longitudinal axis A. The outer edge of the upper wall PS is preferably non-deformable and fixed relative to the outer casing 12, and allows maintaining an annular shape of large diameter for the upper portion of the wall P. The tank 13 is thus deformable and comparable to a flexible pouch and can be emptied by an upward thrust on the wall P without creating any dead volume. The material of the wall P may be a deformable membrane, possibly of elastomer (for example a fluoroelastomer) by way of non-limiting example. The attachment of the membrane is of a type that is known per se, for example by trapping the membrane edge in a fluidtight seal. The rigid bottom 25a of the vessel 25 may optionally be in contact with the flexible bottom of the tank 13 when the latter is in the filled state, as can be seen in FIG. 3. In the example of FIG. 6, it should be noted that the membrane forming the wall P is formed by a nonelastomeric flexible plastic. The wall P can then be composed of a plastic film (may be less than 900 μm thick).

Preferably, the external connection 28 extends in a generally tubular manner so as to define the outlet pipe 12a, and comprises sealing means 36 for automatically closing the outlet pipe 12a in a fluidtight manner when the external connection 28 is in a disengaged state, meaning when it is not connected to the connecting endpiece 35 formed on the axial end 32a of the additive release device 32. The connecting endpiece 35 cooperates, here by engaging the outlet pipe 12a, with the sealing means 36 so that the distribution channel DC is in communication with the interior of the additive tank 13 when the connecting endpiece 35 is engaged with the external connection 28. Optionally, the external connection 28 may float slightly on the annular part 24 (meaning there is a possibility of slight axial movement, typically for a distance of less than or equal to 5 mm) to facilitate assembly and reduce wear of components internal to the external connection 28, as such wear may sometimes cause leakage of the additive.

Referring to FIGS. 3 and 5, the self-sealing external connection 28 comprises a body or tubular portion 28a with two opposite openings, defining a passage of axis X which may be parallel and possibly coincident with the longitudinal axis A. In the engagement position of the connecting endpiece 35 within the external connection 28, the filter element 4 and the additive chamber E are in a stacked configuration and the sealing means 36 are arranged to permit communication of liquid additive through the outlet pipe 12a. The connecting endpiece 35 then extends away from the first end 281 of the external connection 28, in other words away from the opening of the outlet pipe 12a into the internal volume V2 of the additive tank 13, and engages with the sealing means 36. On the side of the second end 282 of the external connection 28 (female end 282 corresponding here to the opening of the additive outlet pipe 12a into the inner space 9), at least one fluidtight radial contact is created between the lateral outer face of the connecting endpiece 35 and one or more annular gaskets J1, J2 mounted internally within the tubular body 28a.

In the example of FIGS. 5 and 6, here the tubular body 28a of the external connection 28 passes through the upper wall PS and has, on its lateral face, external annular projections forming circumferential flanges 28b of triangular cross-section, resembling a fir tree. The tubular body 28a is partially inserted into a plastic endpiece 40 forming part of the tank 13. This endpiece 40, which is typically welded onto the upper wall PS, projects axially outward relative to the upper wall PS of the liquid additive tank 13. This endpiece 40 defines a passage of preferably constant cross-section to engage with the end 281, here in the form of a fir tree. The circumferential flanges 28b deform the flexible material constituting the endpiece 40, forming as many seals as there are consecutive flanges 28b in contact with the endpiece 40. A weld area 40a is defined between the upper wall PS and the lower face of a lip of the endpiece 40. This weld area 40a extends perpendicularly to the axis A.

In a variant with the same type of endpiece 40, the end 281 may have an external annular groove which receives an O-ring. In this case, the end 281 can be locked in place by the engagement of retaining members distributed over the inner face of the endpiece 40 and over the end 281. These are, for example, radially projecting complementary slot element (s) formed in the lower portion of the endpiece 40.

Inside the tubular body 28a, along axis X, a valve 37 which is slidably mounted is used to close the outlet pipe 12a. The valve 37, which is part of the sealing means 36, is biased towards a closed position by a resilient biasing member 38 such as a spring. The fluidtight seal is obtained for example due to the fact that the annular gasket J2 forms an abutment for an axial surface 32 located on the perimeter of the valve 37. A tubular portion T2 of the valve 37 can then come into radial contact with the gasket J2 when the resilient biasing member 38 is no longer subjected to a constraining force (this constraining force is applied or not applied depending on the positioning of the cartridge CC in the filter 1). This resilient biasing member is, for example, formed by a spring bearing on a seat 39 formed in the first end 281. When the connecting endpiece 35 is removed, it is understood that the valve 37 is moved, here by the thrust of the spring, until it comes into contact with this type of abutment so as to occupy a closed position where it completely seals off the liquid additive outlet pipe 12a.

In the non-limiting example of FIGS. 3 and 5, the open state of the sealing means 36 is obtained by thrust against the valve 37, exerted by the connecting endpiece 35 which here is hollow, to place the additive tank 13 in communication with the inner space 9. Insertion of the connecting endpiece 35 corresponds to the mounted state of the cartridge CC, preferably in an attachment configuration of bowl 2 and cover 3 as shown in FIG. 1. Of course, the sealing means 36 may be in other alternative forms. The valve 37 of the sealing means 36 therefore is not necessarily in fluidtight radial contact with the tubular body 28a, and may be in the form of a ball or a piston which seals off a passage opening in an fluidtight manner. When using at least two gaskets J1, J2 in the external connection 28, it may be arranged that these gaskets J1, J2 are each effective over a given temperature range which may be different. As a non-limiting example, the fluidtightness may be improved by distributing two gaskets J1, J2 over an axial distance that is optionally at least equal to the inner diameter D of the inlet E1 defined by the connecting endpiece 35.

In the example of FIG. 3, the design of the upper wall PS is different, so that it comprises the tubular body 28a of the external connection 28 (molded as one part.). With this configuration, there is a shorter chain of positioning allowances for the connecting endpiece 35 relative to the additive chamber E. This eliminates the need for added tolerances when producing intermediate parts to ensure accurate positioning of the first axial end 32a of the additive release device 32.

The distal flange 6 provides a central opening 60 having a first inner diameter D1 which may be less than or substantially equal to the maximum diameter D3 of the additive chamber E (which here is at least as wide as the distal flange 6 in the example of FIGS. 1-6) but greater than the diameter (or equivalent diameter) of the insertion portion 31, to enable engagement of the latter into the inner space 9 during the step of connecting the additive release device 32. To enable assembly of the filter cartridge CC, it is understood that the proximal flange 7 has a central opening 70 having a second inner diameter D2 of similar dimensions to the first inner diameter D1. To optimize the arrangement in the housing (2, 3) and to reduce the overall size of the filter 1, the following relationship can then be satisfied for these diameters:

$$0.5 \leq D1/D3 \leq 1 \text{ and } 0.5 \leq D2/D3 \leq 1$$

Figure 4:
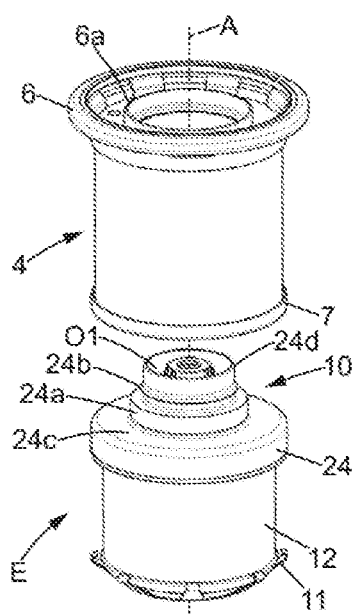
FIG. 4 is an exploded perspective view illustrating the cartridge of FIG. 3.
Figure 8:
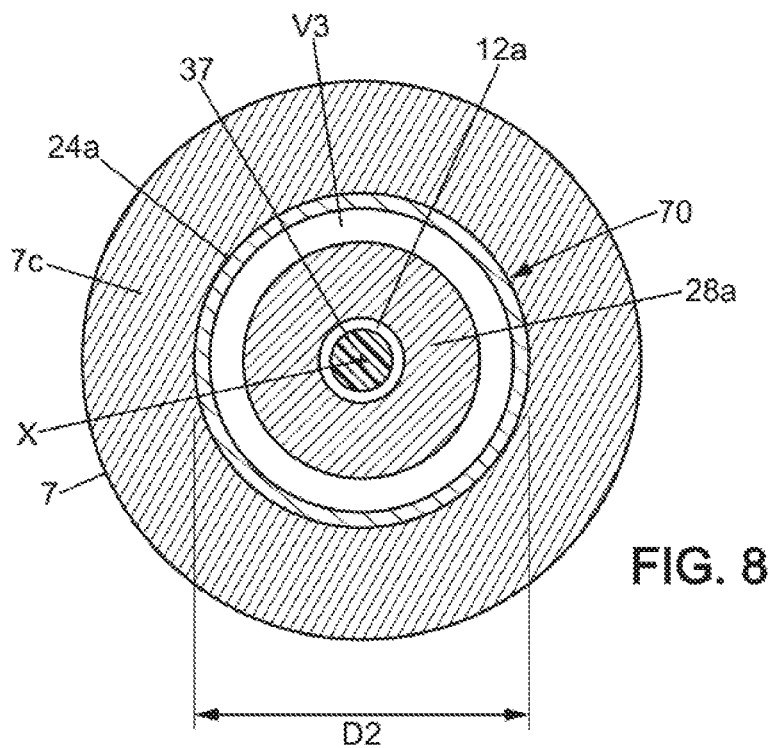

As illustrated in FIG. 4, in practice it is advantageous that the attachment end 10 of the additive chamber E has rotational symmetry, to facilitate assembly with the filter element 4. In this case, the axis X of the passage defined by the tubular body 28a is coincident with the longitudinal axis A of the filter element 4. FIG. 8 also shows the rotational symmetry of the attachment end 10, in the plane of the radial portion 7c of the proximal flange 7. However, it is understood that the passage axis X may be offset laterally relative to the central axis of the annular part 24, the connecting endpiece 35 then being correspondingly offset relative to the longitudinal axis A when the filter cartridge CC is engaged with the insertion portion 31 of the cover 3. The correct angular position can easily be obtained in this case by the use of guide means and/or a position indicator (marking) placed on the distal flange 6.

Referring to FIGS. 3-4 and 8, the annular part 24 of the outer casing 12 comprises the attachment end 10 and a radial portion 24c extending parallel to the radial portion 7c of the proximal flange 7. The attachment end 10 extends through the opening 70 defined by the radial portion. 7c (this portion 7c having an annular shape). The external connection 28 may also traverse this opening 70. In this non-limiting example, the attachment end 10 projects axially relative to the radial portion 24c and surrounds the tubular body 28a of the external connection 28 (the latter thus extending at a radial distance from the inner face 5b of the filter medium 5, the proximal flange 7, and the optional reinforcing member 8).

As can be seen in FIG. 3, the attachment end 10 extends along the proximal flange 7 and allows attaching the additive chamber E on the filter element 4. The attachment end 10 comprises a sealing lip 24d or a bead adjacent to a free edge. This sealing lip 24d is intended to form an annular area of sealing contact, preferably a radial contact, with a corresponding annular inner face of the lower end 31a that inserts into the inner space 9 until adjacent to the proximal flange 7. Alternatively, the bead or similar sealing lip may be formed at the end of the insertion portion 31 in order to cooperate with an annular surface of the attachment end 10.

The attachment end 10 further comprises an annular guiding and sealing surface portion 24a (here a cylindrical bearing) extending annularly from the area where it joins the radial portion 24c of the annular part 24. The proximal flange 7 comprises, on an axially extending portion connected to the inner edge of the radial portion 7c, a continuous annular surface 7d which is in sealed annular contact with the surface portion 24a in the cartridge CC.

Similarly, the distal flange 6 has a sealing lip 6a which is in sealing contact with a corresponding continuous surface of the sealing portion 30. With these two fluidtight areas at the flanges 6 and 7, the filter element 4 is interposed in a fluidtight manner between the annular space 21 of the upstream area Z1 and the inner space 9 which is only in communication with the outlet port 3b as shown in FIG. 1.

Referring now to FIGS. 3, 4, and 6, it can be seen in this example that the annular part 24 has a dome shape and extends between a large annular edge B1 connected to the vessel 25 and a small annular edge B2 which defines a passage for the external connection 28. Here, the external connection 28 is distinct from the annular part 24, through which it is inserted. A collar 28c formed on the periphery of the tubular body 28a limits axial movement of the external connection 28 relative to the annular part 24. Due to this retention, the sealed connection between the end 281 and the upper wall PS of the tank 13 is maintained against forces exerted during insertion or withdrawal of the connecting endpiece 35. Of course, other forms of attachment may be used to keep the external connection 28 integrally secured to the additive chamber E.

Various options may be used for connecting the additive chamber E to the filter element 4, one of which corresponds to nested insertion of the attachment end 10:
  with a connection, here fluidtight, by contact and friction between the surface portion 24a and the continuous surface 7d of the proximal flange 7; and/or
  with snap-fitting by means of clips 24b projecting radially outward from a peripheral surface of the attachment end 10, the clips 24b engaging when positioned beyond one or more abutments 8b that are part of the filter element 4.

In the non-limiting example of FIGS. 4 and 6, the additive chamber E is mounted so as to be inseparable from the filter element 4 by nested insertion into the inner space of the attachment end 10. The clips 24b prevent withdrawal of the attachment end 10 due to the abutment 8b formed at the lower end 8a of the reinforcing member 8. Alternatively, such an abutment may be formed by at least one annular inner lip of the proximal flange 7.

Although these figures show protruding clips 24b arranged in the annular part 24 between the annular surface portion 24a and the sealing lip 24d, other possibilities for retention may be provided, for example with protruding reliefs of the proximal flange 7 engaging with apertures formed in the attachment end.

More generally, it is understood that the attachment end 10 provides fastening means which may extend beyond the lower end 5c of the filter medium to allow connection of the additive chamber E without adding additional height to the dimensions. One will note in FIG. 6 that the axial distance H1 between the lower end 5c of the filter medium 5 and the upper wall PS of the additive chamber 13 can be small (less than 10 mm for example) and typically less than or equal to the height H2 of the distal flange 6.

Figure 9:
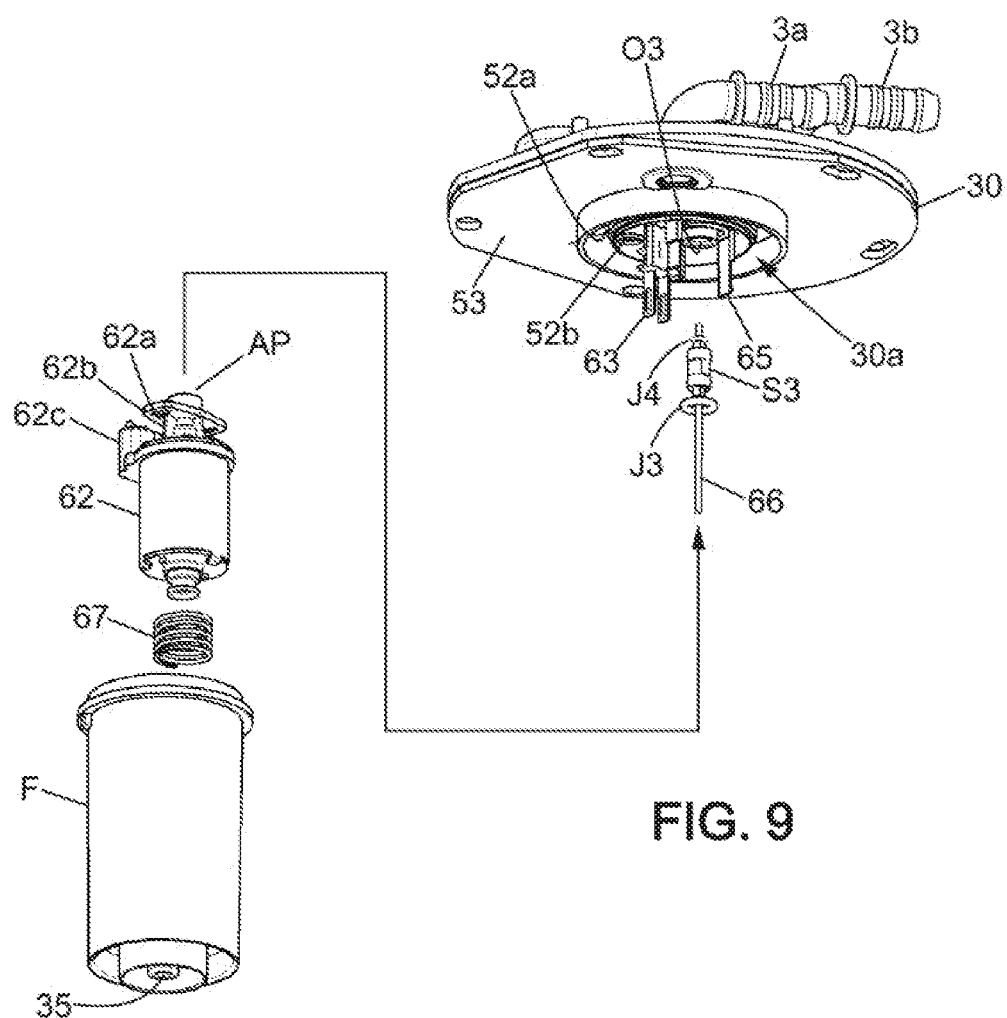
FIG. 9 is an exploded perspective view of an exemplary assembly of an additive release device with solenoid valve.

One embodiment of the additive release device 32 will now be described with reference to FIGS. 1, 9, and 10.

The additive release device 32 here comprises a solenoid valve or similar actuator device 62 enabling the total or partial sealing of the distribution channel DC. The additive release device 32 may be integral with the cover 3. Starting from the assembled state of the filter 1, it is understood that the device 32 is fixed in translation along the longitudinal axis A relative to the cover 3, so that it can be entirely withdrawn from the inner space 9 during replacement of the cartridge CC. The connecting endpiece 35 is engaged without a locking engagement with the external connection 28, the fluidtightness preferably being radial (obtained by at least one annular sealing area), so that movement of the additive release device 32 out of the inner space 9 is not hindered by axial retaining surfaces.

The additive release device 32 comprises for example an external sleeve F to protect the actuator device 62. This protective sleeve F may also comprise a communication line 50 which allows filling the peripheral volume V3 with fuel that travels through the inner space 9 and traverses the flange 6 of the filter element 4. Because communication line 50 communicates with the fuel port O1 and acts as a pressure-balancing-line, The fuel pressure in the peripheral volume V3 is identical to the pressure of the filtered fuel flowing in the fuel channel 52 of the cover 3 upstream of the venturi 22, except for the head loss generated by the design. The communication line 50 may be replaced by any type of circuit that allows directing fuel, preferably clean fuel, to any peripheral volume V3 surrounding all or part of the tank 13. One must simply ensure that the cross-section of the communication line 50 is at least three times greater than that of the transport tube 66.

The sleeve F here is fixedly attached to the sealing portion 30, for example by welding, bonding, or other conventional means of fluidtight attachment. Referring to FIG. 9, the annular area of connection with the sleeve F surrounds a central portion 30a of the sealing portion 30. In this central portion 30a is located, on the side facing the inner space 9, a power plug 63, an opening O3 for the distribution channel DC, and a line opening into the fuel channel 52 and forming a lateral passage 52b extending the communication line 50 to allow pressure equalization. This central portion 30a may also comprise guiding and attachment elements for the actuator component 62, here forming retaining tabs 65 (retention is typically by snap-fitting) which protrude into the inner space 9.

During assembly of the additive release device 32, by way of non-limiting example the following steps may be performed:

insertion of a transport tube 66 for liquid additive into the opening O3, the transport tube 66 being pre-assembled in a support S3 having a generally annular shape;

fluidtight assembly of the support S3 to an axial end of the actuator component 62 (the end on the sealing portion 30 side) with use of one or a plurality of gaskets J3, J4, for example annular, in contact with the transport tube 66 in order to establish a seal between the compartment 64 and the fuel channel 52;

electrical connection, to the power plug 63, of a laterally offset connector 62c on the actuator component 62;

retaining attachment to the sealing portion 30 of the actuator component 62 by engagement of the retaining tabs 65 in slots 62a (formed on a flange 62b of the actuator component 62);

placement of a resilient return member in an energized state that bears on a portion of the sleeve F, here by compression of a spring 67, to urge the support S3 to a position which places the transport tube 66 flush with an inner face of the fuel channel 52; and attachment of the sleeve F to the sealing portion 30 so that the additive inlet E1 forms the only inlet passage of the distribution channel DC and the dispensing port 34 forms the only outlet of the distribution channel DC.

Referring to FIG. 10, the resilient return member, here a helical spring 67, can be used to bias the support S3 to its final position at the time of assembly of the additive release device 32 inside the sleeve F. The resilient return member adjusts for any axial play between the support 33 and the actuator component 62. It is understood that the actuator component 62 can slide longitudinally in the compartment 64 and engage against the inner tube 69 by radial contact, and not axial abutment. In the assembled state of the additive release device 32, the latter is secured to the cover 3 and slides along with it during a step of disconnecting the additive tank 13.

When the support S3 is secured to the actuator component 62 and seated in its final position, the transport tube 66 is sufficiently inserted into the axial additive passage AP of the actuator component 62 to define a segment of the distribution channel DC which extends from the interior of the actuator device 62 to the fuel channel 52. When using a solenoid valve, the transport tube 66 can be sealingly inserted into the axial additive passage AP by a simple adjusted sliding connection and/or a sliding assembly with at least one annular gasket J3.

When a communication line 50 is provided in the sleeve F, it may be arranged so that the latter is attached to the central portion 30a which defines an annular sealing area specific to the end where the communication line 50 joins with the line forming the lateral passage 52b. One can see in FIG. 10 that the communication line 50 opens axially into two opposing openings 50a and 50b.

In the non-limiting example of FIGS. 1 and 10, this communication line 50 is separated in a fluidtight manner from the compartment 64 where the actuator component 62, such as a solenoid valve or similar functional component, is housed. The fuel therefore does not enter or surround the solenoid valve nor does it enter the additive inlet E1 of the distribution channel DC which forms for example an outlet from the compartment 64 to the tank 13. At least one annular gasket J5 may be mounted on the actuator component 62 to establish a seal between the compartment 64 and the distribution, channel DC. More generally, it is understood that here the liquid additive flows in a fluidtight channel so that it is exclusively released in the fuel channel 52. Part of the distribution channel DC is formed by the transport tube 66 which is mounted in the support 33. This support S3 may be placed between the actuator device 62, here the solenoid valve, and the sealing portion 30 of the cover 3, and preferably with direct contact against these elements 62, 30.

As is clearly visible in FIG. 10, the axis of the transport tube 66 may be offset relative to the axis X of the passage (which here corresponds to the longitudinal axis of the connecting endpiece 35). This configuration is chosen to place the communication line 50 in a peripheral area relative to the actuator component 62. The end of the actuator component near the connecting endpiece 35 can sealingly engage with an inner tube 69 of the sleeve F, optionally with the use of at least one gasket. The additive liquid can thus flow from the additive inlet E1 to the transport tube 66 without flowing around the actuator component 62 inside the sleeve F. This protects the internal components of the release device 32. The fact that the additive is channeled so as to flow only in a distribution channel DC narrower than the fuel channel 52 allows effective use of the negative pressure related to the increased fuel velocity in the venturi 22.

In a preferred embodiment, the fuel channel 52 has a narrower section forming the venturi 22 at a distance from the inlet passage 52a and at a distance from the outlet 3b, and enabling the acceleration effect. The fuel channel 52 is, for example, defined by a molded plastic part 53 which has an upper face 53a and a lower face 53b from which a tube 53c protrudes in a direction parallel to the longitudinal axis A in the assembled state of the filter element 4. The tube 53c can be used to define, with the flange 6 of the filter element 4, an annular cover/filter element sealing area, as shown in FIG. 1. The upper face 53a may be covered by a outer wall 3c of the cover 3 which in this case provides the inlet port 3a and outlet port 3b. Plug elements 54, 55 are sealingly engaged in the ends of the fuel channel 52, to prevent fuel from coming into contact with the upper wall 3. In addition, they guide the fuel to the venturi 22, and the fuel loaded with additive to the outlet 3b.

The transport tube 66 of the distribution channel DC is preferably arranged perpendicularly to the fuel channel 52. As illustrated in FIG. 10, an increase in cross-section between the venturi 22 and the fuel outlet 3b may optionally be provided, to restore to the additive-loaded fuel a velocity close to that of the fuel entering the fuel channel 52.

It is understood that the transport tube 66 may have a relatively small inner diameter, for example less than or equal to 2 mm and preferably less than 1 mm. The size of the transport tube 66 (the length is typically at least equal to 10 mm, and preferably at least 20 mm) reinforces the negative pressure generated by the venturi 22. Where appropriate, the transport tube 66 may have a capillary function. In this case, depending on the rate of diffusion via this type of capillary tubing, it is possible in a variant embodiment to eliminate the venturi 22 and possibly dispense via the transport tube 66, for example in the return circuit.

The presence of a sealing member (not shown) in the actuator component 62 can prevent or limit the incidental release of liquid additive into the fuel channel 52 (for example when the vehicle is being transported).

Controlling the release of additive from the tank 13 of the additive chamber E to the dispensing port 34 will now be described with reference to FIGS. 1, 5 and 10.

During operation of the filter 1, the fuel flows continuously between the fuel inlet and outlet ports 3a and 3b. The venturi 22, which here constitutes the pressure difference generation means, generates a negative pressure between the additive dispensing port 34 and the fuel outlet port 3b. As the additive chamber E is in communication with the fuel outlet port 3b via the line 50, the peripheral volume V3 is filled with fuel at the same pressure as the fuel flowing at the fuel outlet port 3b. The wall P of the additive tank 13, which is here a movable and fluidtight wall, maintains an identical pressure between the additive in the additive tank 13 and the fuel in the peripheral volume V3.

The pressure in the additive tank 13 is therefore greater than the pressure at the dispensing port 34, which forces the additive to move from the tank 13 to the dispensing port 34 and then diffuse into the fuel flowing through the venturi 22 and thus into the fuel circulation circuit C1. The actuator device 62 allows preventing or reducing the flow of additive. For example, a solenoid valve is used to stop the release of additive when the engine is off. A solenoid valve of a type that is known per se may be used, with a sealing member suitable for sealing off the distribution channel DC. For example, a conventional sealing member (not shown) is used that is movable in the axial direction, parallel to the longitudinal axis A. The sealing member in the closed position bears on a seat that is usually located in a joining area between two sections of the distribution channel DC. Movement can be controlled by an electromagnet, in known manner (typically by an electrical command received by the additive release device 32). A solenoid valve where the largest dimension is about 10 cm may be suitable for this type of application.

In this embodiment, the actuator device 62 is illustrated as an electromechanical means for total or partial sealing of the additive distribution channel DC. The use of such a means is optional, however, and the invention can of course be implemented without sealing off the distribution channel DC or by using other means for sealing off the additive distribution channel, such as a thermal valve, an "umbrella" valve, a check valve, or a hydraulically controlled valve.

In addition, in a non-limiting example, the additive may be heated prior to injection into the fuel circulation circuit C1. According to a preferred option, the additive which exits the tank 13 is heated before entering the distribution channel DC. A heating-surface member can thus be placed near or in the first axial end 32a. The additive is heated to a temperature of, for example, between 30 and 60° C. One of the advantages related to heating the additive is that this allows its distribution through the distribution channel DC at a substantially constant temperature, and therefore at a constant viscosity. When the distribution channel DC is formed by capillary tubing (very small diameter), eliminating variations in the additive viscosity enables precise control of the amount of additive injected. Such heating is particularly useful in compensating for viscosity variations due to localized heating not managed by the actuator device 62.

To optimize the heat exchange (minimize heat loss and the energy required for heating), it is preferred to heat the additive near the inlet of the distribution channel DC rather than the additive contained in the tank 13.

In one embodiment, the device 32 may have a heating device (not shown), for example electric, provided with a connector which is externally accessible on the cover 3 or similar portion of the housing. A connecting wire, for example embedded in the side wall of the device 32, can be used to establish the connection between the connector and the heating-surface member of the heating device. The heating-surface member may be provided on a board or a similar electronic circuit component. In this case, the heating surface is typically formed by one or more PTC (Positive Temperature Coefficient) heating elements.

Alternatively, heating may result at the first axial end 32a by heating the fuel which then passes through the filter medium 5 and can enter a channel which traverses and/or surrounds the first axial end 32a. More generally, it is understood that the additive may be heated upstream of the dispensing port 34, preferably between the connecting endpiece 35 and an inlet of the distribution channel DC.

In alternative embodiments, the peripheral volume V3 may be filled with fuel from the upstream area Z1, or the additive tank 13 may be brought to the pressure of another fluid and/or the pressure from a pressure generator.

One advantage of the invention lies in the method of assembling an insertion portion 31 of the cover 3 through the filter element 4 to create the connection with the additive chamber E, which eliminates contact with the outlet of the additive tank 13 and minimizes bulk.

Another advantage is the use of a flexible tank 13 which can fully contract and close in on itself due to the ability of the wall P, initially bowl-shaped, to approach the upper wall PS unhindered (as liquid additive is gradually released into the circuit C1). Of course, the tank 13 may have a different geometry than a simple pouch with a rounded bottom, and the example of the figures is given only by way of illustration.

The device of the invention allows conveying any type of additive contained in a fuel. These additives can be classified into two categories: those which have a catalytic function to assist the regeneration of particulate filters (PF), usually referred to as Fuel Borne Catalysts (FBC), and those which have a function other than a catalytic function.

The additives may be in liquid or solid form.

FBC additives may be in the form of a salt or an organometallic complex, or a mixture of these salts or complexes, soluble or dispersible in the fuel. They may also be in the form of a colloidal dispersion. The colloids of this dispersion may be based on a compound of a rare earth and/or a metal selected from groups IIA, IVA, VIIA, VIII, IB, IIB, IIIB, and IVB of the periodic table.

More particularly, they may be cerium-based and/or iron-based compounds.

The periodic table referred to above is the one published in the Supplement to the Bulletin de la Société Chimique de France, No. 1 (January 1966).

It is also possible to use colloidal dispersions which comprise detergent compositions.

For examples of colloidal dispersions, we can mention those described in patent applications EP 671205, WO 97/19022, WO 01/10545, and WO 03/053560, the latter two describing dispersions respectively based on cerium and iron compounds, these dispersions also containing an amphiphilic agent.

Applications WO 2012/084838 and WO 2012/084851 disclose iron dispersions in crystalline form which may also be used.

We can also mention applications WO 2010/150040, WO 2012/084906, and WO 2012/097937, which describe colloidal dispersions based on an iron compound, an amphiphilic agent, and a detergent composition comprising a quaternary ammonium salt.

Other types of known additives, which are not FBCs and which have a function other than a catalytic function, may also be injected into the fuel circuit. These additives improve fuel distribution in the engine and/or engine performance and/or engine stability during operation.

Examples are defoamers, deicing additives, polymer additives reducing the temperature at which the fuel clouds or freezes, and flow improving additives.

Corrosion inhibiting additives may also be used.

Additives to improve engine performance may also be used, such as cetane boost additives, octane boost additives, smoke inhibiting additives, friction modifier (FM) additives, or "extreme pressure" additives.

Detergent additives intended to reduce deposits at the injectors may also be used.

Lubricity improver additives may also be used to prevent wear or seizing, particularly in the high-pressure pumps and injectors, as fuel lubricity is poor.

Additives to improve engine stability during operation may be considered: antioxidants, stabilizers, metal deactivating agents to neutralize the catalytic effects of certain metals, dispersants to disperse formed particles and prevent agglomeration of relatively large particles may also be used.

According to one particular embodiment, the additive is a combination, of a detergent additive and a lubricant additive, and possibly a corrosion inhibiting additive.

An FBC-type additive associated with a detergent-type fuel performance additive as described above (patent application WO 2010/150040) is particularly advantageous in the case of a vehicle equipped with a particulate filter.

In the same case, it is also advantageous to associate multiple fuel performance additives with an FBC-type additive, particularly when the vehicle is sold in a geographic area where fuel is of variable and/or poor quality.

In the case of a vehicle not equipped with a particulate filter, various types of additive combinations can be considered, such as one combining one or more detergents with a lubricant and a corrosion inhibitor.

It should be obvious to those skilled in the art that the invention allows embodiments to take many other specific forms without departing from the scope of the invention as claimed. In particular, although the description mentions a few examples for the implementation of fluidtight sealing areas, a person skilled in the art understands that any other embodiment providing an annular seal is suitable for the sealing area between the filter element 4 and the cover 3 (the same is true for a sealing area between the filter element 4 and the additive chamber E).

In addition, it is understood that the pressure difference is not necessarily generated by a phenomenon of negative pressure, for example by a venturi 22 (the use of a diaphragm being an alternative to the venturi 22), and can also result from the creation of a positive pressure exerted on the outer face of at least one wall P of the additive tank 13. It is also understood that the pressure difference generation means may be the filter element 4; in this case the sealing portion 30 can be without a venturi and the pressure equalization line 50 formed in the insertion portion 31 can be eliminated.

The invention claimed is:

1. A fuel filter, comprising:
   a housing extending between a first end defining a base and a second end formed by a cover, the housing delimiting an internal volume and having an inlet for unfiltered fuel and an outlet for filtered fuel, an internal fuel channel being formed within the cover to allow filtered fuel to circulate toward the filtered fuel outlet;
   a filter element for filtering unfiltered fuel, the filter element being arranged in the internal volume and which has a first axial end engaged against the cover, a second axial end, and an annular filter medium extending between the first axial end and the second axial end, the filter medium having an inner face defining an inner space;
   an additive tank containing a liquid additive suitable for mixing with filtered fuel;
   an outer casing delimiting an additive chamber, the additive tank being included within the outer casing; and
   an additive release device for dispensing the liquid additive from said additive tank into a fuel circulation circuit for an internal combustion engine, the additive release device comprising a distribution channel and at least one actuator component adapted for selectively sealing, totally or partially, said distribution channel, wherein at least for an open position of the actuator component, the distribution channel is in fluid communication with the additive tank and opens into the internal fuel channel;

wherein the additive release device extends at least partially into the inner space and comprises an additive transport tube that defines a portion of the distribution channel, said actuator component extending into the inner space, the transport tube being inserted into an additive passage of the actuator component, wherein the internal fuel channel, which extends upstream from the filter element, is in communication with the filtered fuel outlet and comprises:

an inlet passage, distinct from the inlet for unfiltered fuel, which is in communication with the inner space and opens near the first axial end of the filter element; and a lateral passage, distinct from the inlet passage and from the inlet for unfiltered fuel, positioned between the inlet passage and the filtered fuel outlet;

wherein the additive tank defines, with the outer casing, a peripheral volume which is in fluidtight communication with the lateral passage, wherein the inlet for unfiltered fuel and the outlet for filtered fuel are arranged at a distance from said base, the distribution channel defining a liquid additive dispensing port which opens into the internal fuel channel, the additive dispensing port being separate from the inlet for unfiltered fuel and from the outlet for filtered fuel, and wherein the internal fuel channel comprises a venturi to generate a pressure difference between:
the inlet for unfiltered fuel or outlet for unfiltered fuel; and the additive dispensing port.

2. The fuel filter according to claim 1, wherein the additive release device is secured to a housing portion selected from among the cover and the base and is fixed in translation along a longitudinal axis of the filter element relative to the housing portion.

3. The fuel filter according to claim 1, comprising a sleeve having a free end adapted for connection to the additive tank, said sleeve comprising:
a compartment to accommodate the actuator component; and
a line separate from the compartment and extending between two axially opposite openings, one of the two opposite openings placing the line in communication with the internal fuel channel.

4. The fuel filter according to claim 3, wherein,
at least one annular gasket is mounted on the transport tube to create a seal between the compartment and the internal fuel channel,
and wherein at least one annular gasket is mounted on the actuator component to create a seal between the compartment and the distribution channel.

5. The fuel filter according to claim 3, wherein:
the filter element defines an upstream area in communication with the unfiltered fuel inlet, and a downstream area in communication with the filtered fuel outlet;
the downstream area comprises, in the inner space, a first sub-area internal to the sleeve which is defined by said line and a second sub-area external to the sleeve which extends annularly between the inner face of the filter medium and an outer face of the sleeve.

6. The fuel filter according to claim 1, wherein the internal fuel channel is in communication with the inner space via at least one line traversing the first axial end of the filter element, the internal fuel channel being delimited by a molded plastic part which comprises:
an upper face, optionally covered by an outer wall of the cover which provides at least one among the inlet for unfiltered fuel port and the outlet for filtered fuel; and
a lower face from which a sealing tube protrudes in a direction parallel to a longitudinal axis of the filter element, the sealing tube defining with the second axial end of the filter element an annular cover/filter element sealing area.

7. The fuel filter according to claim 1, comprising:
an outer casing delimiting an additive chamber, and wherein the additive tank is included within the outer casing and defines, with the outer casing, a peripheral volume which is in fluidtight communication with the lateral passage.

8. The fuel filter according to claim 7, wherein the additive tank has at least one movable wall that is fluidtight between an internal volume of the additive tank and the peripheral volume defined by the outer casing, said movable wall providing a sealed separation and contributing to maintaining an identical pressure between the additive in the additive tank and the fuel in the peripheral volume.

9. The fuel filter according to claim 7, comprising in the inner space, parallel to the distribution channel, a pressure-balancing line which is in communication with the internal fuel channel and extends to the vicinity of the second axial end of the filter element so as to be in communication with said peripheral volume.

10. A fuel filter comprising:
a housing extending between a first end defining a base and a second end formed by a cover, the housing delimiting an internal volume and having an inlet for unfiltered fuel and an outlet for filtered fuel, an internal fuel channel being formed within the cover to allow filtered fuel to circulate toward the filtered fuel outlet;
a filter element for filtering unfiltered fuel, the filter element being arranged in the internal volume and which has a first axial end engaged against the cover, a second axial end, and an annular filter medium extending between the first axial end and the second axial end, the filter medium having an inner face defining an inner space;
an additive tank containing a liquid additive suitable for mixing with filtered fuel;
an outer casing delimiting an additive chamber, the additive tank being included within the outer casing;
an additive release device for dispensing the liquid additive from said additive tank into a fuel circulation circuit for an internal combustion engine, the additive release device comprising a distribution channel and at least one actuator component adapted for selectively sealing, totally or partially, said distribution channel, wherein at least for an open position of the actuator component, the distribution channel is in fluid communication with the additive tank and opens into the internal fuel channel;
a sleeve to protect the actuator component; and
in the inner space, parallel to the distribution channel, a pressure-balancing line which is in communication with the internal fuel channel,
wherein the additive release device extends at least partially into the inner space and comprises an additive transport tube that defines a portion of the distribution channel, said actuator component extending into the inner space, the transport tube being inserted into an additive passage of the actuator component, wherein the internal fuel channel, which extends upstream from the filter element, is in communication with the filtered fuel outlet and comprises:
an inlet passage, distinct from the inlet for unfiltered fuel, which is in communication with the inner space and opens near the first axial end of the filter element; and
a lateral passage, distinct from the inlet passage and from the inlet for unfiltered fuel, positioned between the inlet passage and the filtered fuel outlet;
wherein the additive tank defines, with the outer casing, a peripheral volume which is in fluidtight communication with the lateral passage,
wherein the pressure-balancing line extends to the vicinity of the second axial end of the filter element so as to be in communication with the peripheral volume,
wherein the additive tank has at least one movable wall that is fluidtight between an internal volume of the additive tank and the peripheral volume, said movable wall providing a sealed separation and contributing to maintaining an identical pressure between the additive in the additive tank and the fuel in the peripheral volume,
wherein the inlet for unfiltered fuel and the outlet for filtered fuel are arranged at a distance from said base, the distribution channel defining a liquid additive dispensing port which opens into the internal fuel channel, the additive dispensing port being separate from the inlet for unfiltered fuel and from the outlet for filtered fuel,
and wherein the internal fuel channel comprises a venturi to generate a pressure difference between:
the inlet for unfiltered fuel or outlet for unfiltered fuel; and the additive dispensing port,
wherein the filter element defines an upstream area in communication with the inlet for unfiltered fuel, and a downstream area in communication with the outlet for filtered fuel, the downstream area comprising, in the inner space:
a first sub-area internal to the sleeve, and
a second sub-area external to the sleeve and which extends annularly between the inner face of the filter medium and an outer face of the sleeve,
and wherein the pressure-balancing line opens into the internal fuel channel via the lateral passage and is sealingly separated from the second sub-area by a fluidtight annular contact between the sleeve and a sealing surface formed on the outer casing, whereby the pressure in the peripheral volume corresponds to the pressure in the lateral passage.

11. The fuel filter according to claim 1, wherein the housing comprises:
a bowl comprising the base and adapted to accommodate the additive tank; and
said cover which comprises a sealing portion covering the bowl and an insertion portion extending into the inner space, the sealing portion including the inlet for unfiltered fuel and the outlet for filtered fuel;
and wherein the insertion portion comprises the distribution channel, said actuator component, and a connecting endpiece formed opposite to the sealing portion, the connecting endpiece being adapted for connection to the additive tank in a fluidtight seal.

12. The fuel filter according to claim 11, wherein the additive release device is intended to be mounted with the cover on the fuel circulation circuit, and wherein the insertion portion has a tubular shape, the filter element being removably mounted around the insertion portion.

13. The fuel filter according to claim 11, wherein the filter element comprises:
a flange at each of the first and second axial ends; and
a reinforcing member to protect the inner face of the filter medium.

14. The fuel filter according to claim 1, wherein the actuator component comprises a sealing member which is moved according to an electrical command received by the additive release device.

15. The fuel filter according to claim 1, comprising:
an outer casing delimiting an additive chamber where the additive tank is provided;
wherein the internal fuel channel is in communication with the inner space via a line traversing the first axial end of the filter element, the line opening in the lateral passage, and wherein the outer casing comprises a fuel port to allow filtered fuel in said line to enter the additive chamber, whereby said line allows a fuel pressure to be exerted onto a movable wall of the additive tank.

16. The fuel filter according to claim 1, wherein the actuator component extends entirely outside the outer casing.

17. The fuel filter according to claim 7, wherein the distribution channel is narrower than the internal fuel channel and extends parallel to a pressure-balancing line that extends from the lateral passage to a port opening in the peripheral volume.

18. A fuel filter comprising:
a housing extending between a first end defining a base and a second end formed by a cover, the housing delimiting an internal volume and having an inlet for unfiltered fuel and an outlet for filtered fuel, an internal fuel channel being formed within the cover to allow filtered fuel to circulate toward the filtered fuel outlet;
a filter element for filtering unfiltered fuel, the filter element being arranged in the internal volume and which has a first axial end engaged against the cover, a second axial end, and an annular filter medium extending between the first axial end and the second axial end, the filter medium having an inner face defining an inner space;
an additive tank containing a liquid additive suitable for mixing with filtered fuel; and
an additive release device for dispensing the liquid additive from said additive tank into a fuel circulation circuit for an internal combustion engine, the additive release device comprising a distribution channel and at least one actuator component adapted for selectively sealing, totally or partially, said distribution channel, wherein at least for an open position of the actuator component, the distribution channel is in fluid communication with the additive tank and opens into the internal fuel channel;
wherein the additive release device extends at least partially into the inner space, said actuator component extending into the inner space,
wherein the internal fuel channel, which extends upstream from the filter element, is in communication with the filtered fuel outlet and comprises:
an inlet passage, distinct from the inlet for unfiltered fuel, which is in communication with the inner space and opens near the first axial end of the filter element; and a lateral passage, distinct from the inlet passage and from the inlet for unfiltered fuel, positioned between the inlet passage and the filtered fuel outlet.

19. The fuel filter according to claim 18, wherein the inlet for unfiltered fuel and the outlet for filtered fuel are arranged at a distance from said base, the distribution channel defining a liquid additive dispensing port which opens into the internal fuel channel, the additive dispensing port being separate from the inlet for unfiltered fuel and from the outlet for filtered fuel.

20. The fuel filter according to claim 18, wherein the internal fuel channel comprises a venturi to generate a pressure difference between:
   the inlet for unfiltered fuel or outlet for unfiltered fuel;
   and the additive dispensing port.

\* \* \* \* \*